United States Patent
Dooley et al.

(10) Patent No.: US 8,949,579 B2
(45) Date of Patent: Feb. 3, 2015

(54) INEFFECTIVE PREFETCH DETERMINATION AND LATENCY OPTIMIZATION

(75) Inventors: Miles R. Dooley, Austin, TX (US);
Venkat R. Indukuru, Austin, TX (US);
Alex E. Mericas, Austin, TX (US);
Francis P. O'Connell, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1158 days.

(21) Appl. No.: 12/897,008

(22) Filed: Oct. 4, 2010

(65) Prior Publication Data
US 2012/0084511 A1 Apr. 5, 2012

(51) Int. Cl.
*G06F 9/38* (2006.01)
*G06F 12/08* (2006.01)

(52) U.S. Cl.
CPC .......... *G06F 12/0862* (2013.01); *G06F 9/3802* (2013.01); *G06F 9/383* (2013.01); *G06F 12/0897* (2013.01); *G06F 2212/6024* (2013.01)
USPC ....................................... 712/207

(58) Field of Classification Search
CPC combination set(s) only.
See application file for complete search history.

(56) References Cited

U.S. PATENT DOCUMENTS

| | | | |
|---|---|---|---|
| 5,732,253 A | 3/1998 | McMahan | |
| 5,802,292 A | 9/1998 | Mogul | |
| 5,941,981 A * | 8/1999 | Tran | 712/207 |
| 6,065,115 A | 5/2000 | Sharangpani | |
| 6,216,219 B1 * | 4/2001 | Cai et al. | 712/207 |
| 6,523,093 B1 * | 2/2003 | Bogin et al. | 711/137 |
| 7,370,152 B2 * | 5/2008 | Woo et al. | 711/137 |
| 7,389,385 B2 | 6/2008 | Serrano | |
| 7,441,110 B1 | 10/2008 | Puzak | |
| 7,457,926 B2 * | 11/2008 | Shen et al. | 711/156 |
| 8,255,631 B2 * | 8/2012 | Chen et al. | 711/137 |
| 2003/0018857 A1 * | 1/2003 | Anderson et al. | 711/137 |
| 2006/0026372 A1 * | 2/2006 | Kim et al. | 711/160 |
| 2009/0287884 A1 * | 11/2009 | Toyoshima et al. | 711/137 |
| 2010/0070716 A1 * | 3/2010 | Toyoshima et al. | 711/137 |

OTHER PUBLICATIONS

Nesbit—"Data Cache Prefetching Using a Global History Buffer", Dept. of Electrical and Computer Engineering Universtity of Wisconsin, IEEE Micro, vol. 25, Issue 1 (Jan. 12, 2005).
Vanderwiel—"Data Prefetch Mechanisms", Department of Electrical & Computer Engineering University of Minnesota, ACM Computing Surveys, vol. 32, Issue 2 (Jun. 2000).

* cited by examiner

*Primary Examiner* — Eric Coleman
(74) *Attorney, Agent, or Firm* — Parashos Kalaitzis; Mark P Kahler

(57) ABSTRACT

A processor of an information handling system (IHS) initiates an L3 cache prefetch operation in response to a demand load during instruction processing. The processor selects an L3 cache prefetch at random for tracking as a target prefetched instruction. The processor initiates an L1 cache target prefetch operation and stores the resultant target prefetched instruction in the L1 cache. If a demand load arrives, the processor analyzes the target prefetched instruction for effectiveness and determines the source of the prefetch data. If a demand does not arrive, the processor tests to determine if the particular prefetched instruction timed out in the cache and identifies the ineffectiveness of the prefetch operation. The processor samples multiple prefetch operations at random and generates a history of prefetch effectiveness and other useful prefetch information. The processor stores the prefetch effectiveness information to enable reduction or removal of ineffective prefetch operations.

16 Claims, 5 Drawing Sheets

PREFETCH TRACKER

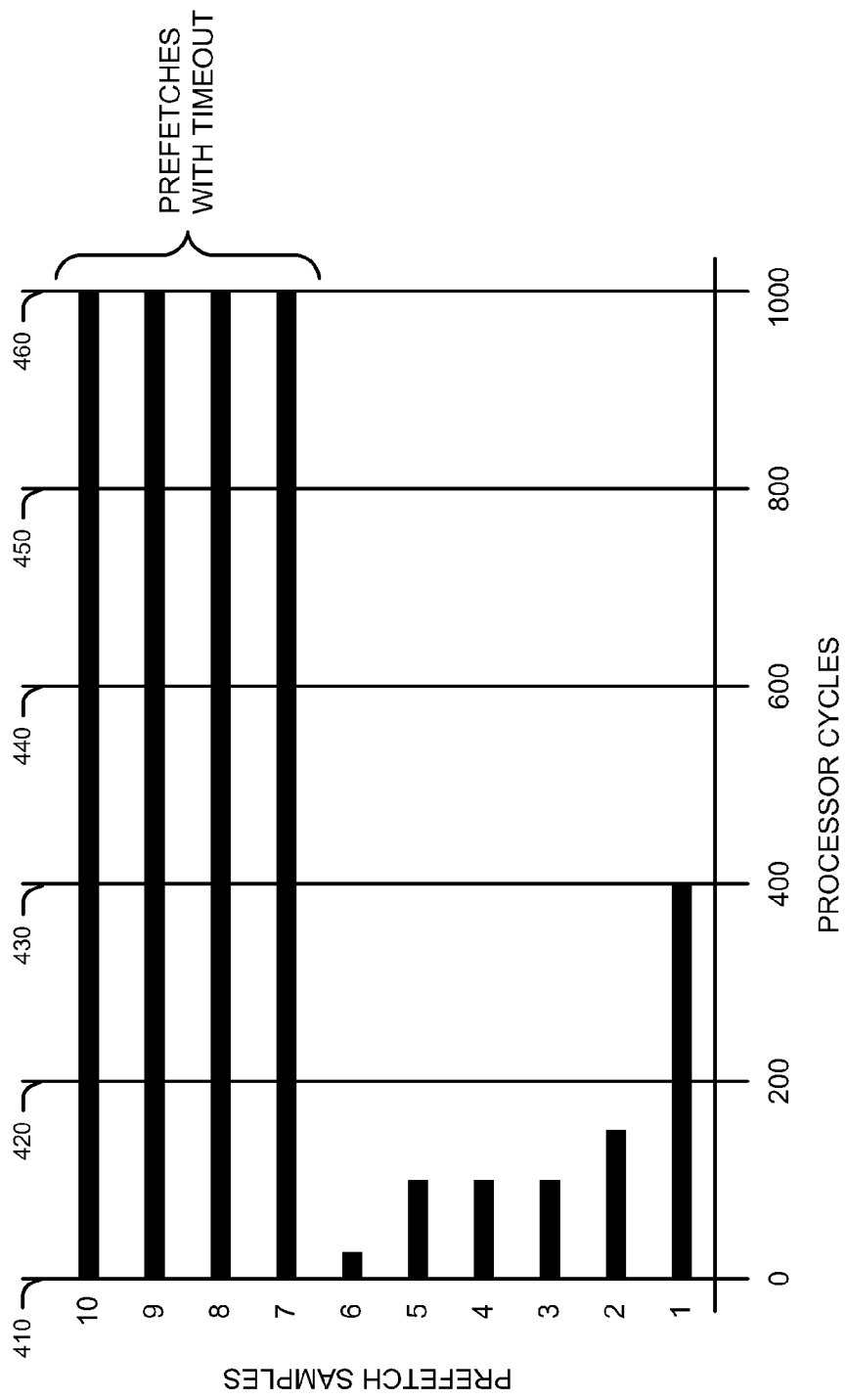

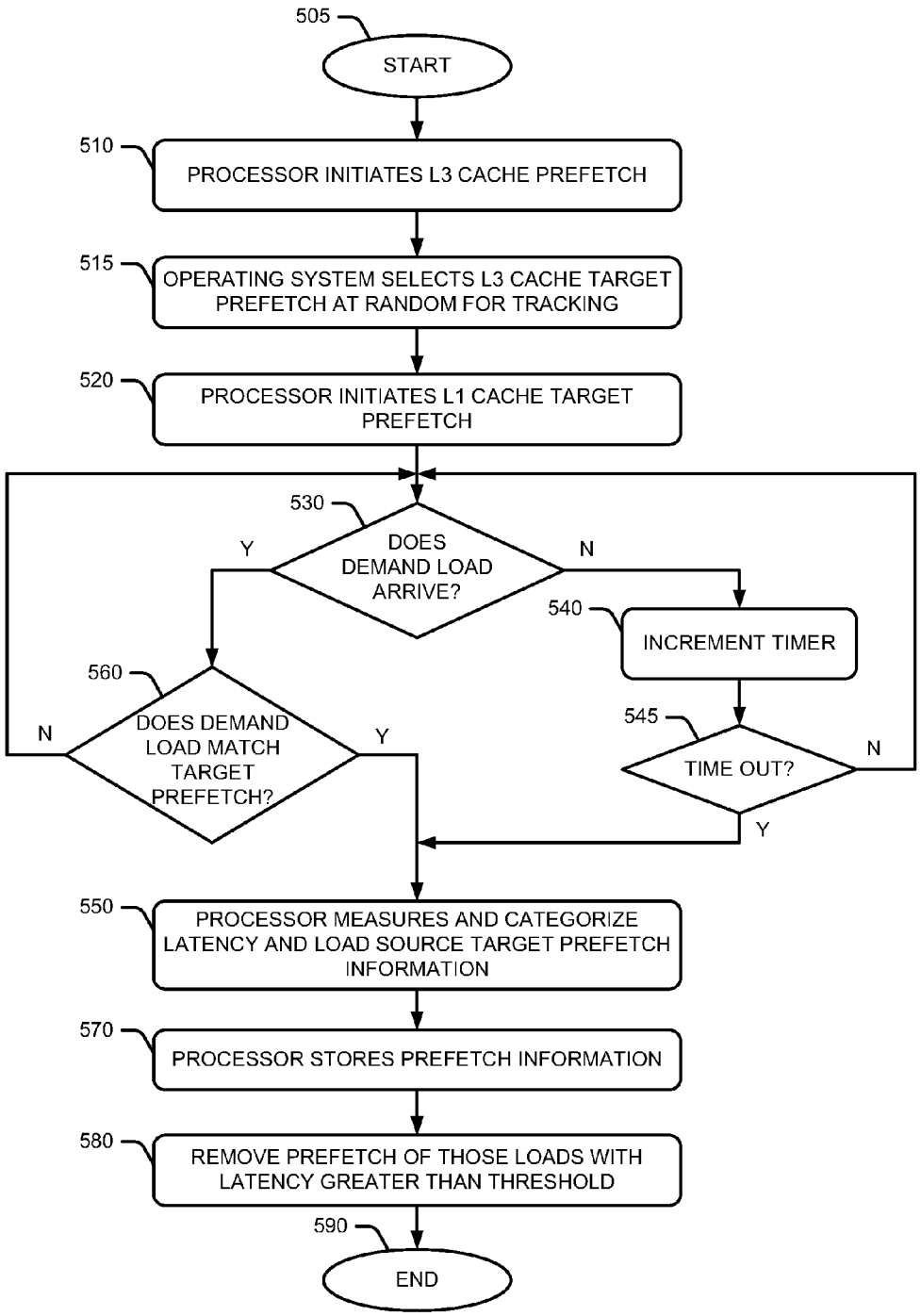

INEFFECTIVE PREFETCH DETERMINATION AND LATENCY OPTIMIZATION

BACKGROUND

The disclosures herein relate generally to information handling systems (IHSs), and more specifically, to management of instruction and data prefetching inefficiencies in an IHS.

Information handling systems (IHSs) typically employ processors that execute applications or other processes that may require the resources of memory or other stored data. Processors of an IHS may prefetch or pre-load certain remote memory data and store that instruction or memory data in local cache memory for later processor use. Processors that execute instructions or threads employing memory stores that reside in local cache or other local memory benefit from lower latency and efficiency improvements therein. Processors may benefit from improved prefetch management.

BRIEF SUMMARY

In one embodiment, a method of determining the ineffectiveness of prefetches in a processor is disclosed. The method includes prefetching, by the processor, a plurality of prefetch instructions from an instruction source. The method also includes storing, by the processor, the plurality of instructions in a cache, namely a prefetch cache. The method further includes selecting, by the processor, a particular instruction of the plurality of instructions or hardware generated prefetches for ineffectiveness tracking. The method still further includes initiating, by a processor performance monitoring unit (PMU) in the processor, a timer to measure the time to wait before deeming a prefetch ineffective. The method also includes testing, by the processor PMU, for ineffectiveness of the prefetch of the particular instruction or hardware generated prefetch by accessing the timer to determine if timeout is reached for the particular instruction or based on measurement of latency of target loads, thus designating an ineffective prefetch. The method further includes storing in a database, by the processor, prefetch information that includes a prefetch source address associated with the particular instruction and a prefetch age of the particular instruction. The method also includes prohibiting, by the processor PMU, the processor from prefetching instructions from the instruction source in an address range associated with ineffective prefetched instructions.

In another embodiment, a processor is disclosed that includes an instruction source that provides an instruction stream for execution by the processor. The processor includes an instruction fetcher, coupled to the instruction source, that fetches instructions from the instruction source. The processor also includes a prefetch cache, coupled to the instruction fetcher, that stores prefetched instructions. The processor further includes a plurality of execution units for executing instructions. The process still further includes a dispatcher, coupled to the instruction fetcher and the plurality of instruction units, that dispatches instructions to the plurality of execution units. The processor also includes a performance monitoring unit (PMU), coupled to the instruction fetcher, the prefetch cache and the plurality of execution units. The PMU is configured to track prefetch instructions from the instruction source and store information about the prefetched instructions in a machine accessible register. The PMU is also configured to initiate a timer to measure the time that the particular instruction ages in the cache. The PMU is further configured to test for ineffectiveness of the prefetch of the particular instruction by accessing the timer to determine if timeout is reached for the particular instruction, thus designating an ineffective prefetched instruction. The PMU is still further configured to store in a database prefetch information that includes a prefetch source address associated with the particular instruction and a prefetch age of the particular instruction. The PMU is also configured to prohibit the processor from prefetching instructions from the instruction source in an address range associated with ineffective prefetched instructions.

In yet another embodiment, an information handling system (IHS) is disclosed that includes a memory and a processor coupled to the memory. The processor includes an instruction source that provides an instruction stream for execution by the processor. The processor includes an instruction fetcher, coupled to the instruction source, that fetches instructions from the instruction source. The processor also includes a prefetch cache, coupled to the instruction fetcher, that stores prefetched instructions. The processor further includes a plurality of execution units for executing instructions. The process still further includes a dispatcher, coupled to the instruction fetcher and the plurality of instruction units, that dispatches instructions to the plurality of execution units. The processor also includes a performance monitoring unit (PMU), coupled to the instruction fetcher, the prefetch cache and the plurality of execution units. The PMU is configured to track prefetch instructions from the instruction source and store the information about prefetched instructions. The PMU is also configured to initiate a timer to measure the time that the particular instruction ages in the prefetch cache before the particular instruction times out in the prefetch cache. The PMU is further configured to test for ineffectiveness of the prefetch of the particular instruction by accessing the timer to determine if timeout is reached for the particular instruction, thus designating an ineffective prefetched instruction. The PMU is still further configured to store in a database prefetch information that includes a prefetch source address associated with the particular instruction and a prefetch age of the particular instruction. The PMU is also configured to prohibit the processor from prefetching instructions from the instruction source in an address range associated with ineffective prefetched instructions.

BRIEF DESCRIPTION OF THE DRAWINGS

The appended drawings illustrate only exemplary embodiments of the invention and therefore do not limit its scope because the inventive concepts lend themselves to other equally effective embodiments.

FIG. 4 shows prefetch latency data in an effective address range diagram that demonstrates the disclosed prefetch tracking methodology.

FIG. 5 depicts a flowchart of an embodiment of the disclosed prefetch tracking method that provides IHS prefetching effectiveness measures and improvements.

DETAILED DESCRIPTION

Figure 1:
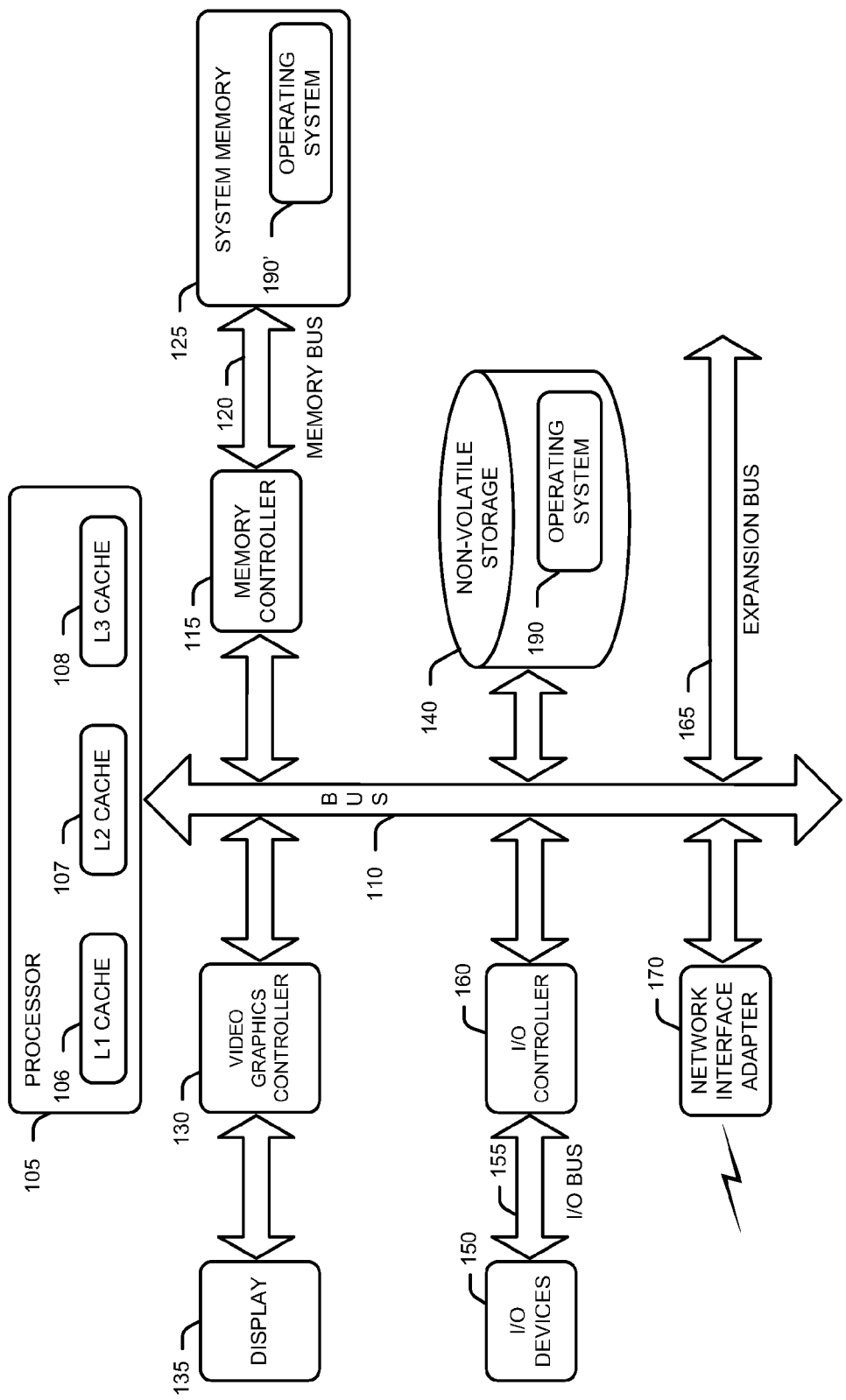
FIG. 1 shows a block diagram of a representative information handling system (IHS) that employs the disclosed prefetch tracking methodology.

Information handling systems (IHSs) typically employ processors with operating systems that execute applications or other processes within the IHS. The IHS may include multiple processors, such as processor cores, or other processor elements for application execution and other tasks. A particular IHS processor may communicate with local memory stores, such as L1 cache, L2 cache, L3 cache, or other local memory. The particular processor may also communicate with remote memory stores, such as other processor caches, main memory or system memory, hard drives, and across network resources to remote computers or servers, or other remote memory. During execution of an application or process, process threads may require information from memory stores of the IHS. Prefetching information from remote memory stores and storing that information in local stores for future use may provide a processor with improvements in memory access time and thereby improvements in latency.

Threads that share data may also share memory resources, such as the processor's local memory, that include working data sets. High speed local cache or local memory of a processor may reduce the amount of resource requirements or overhead that processors exhibit during thread processing by storing these working data sets or thread data close to the executing processor. One or more threads that access the working data sets provide a demand load. The demand load is the processor's demand for that information group or memory group of instructions or data that corresponds to the working set of data. The processor may generate the demand load during execution of threads, such as within one or more execution units of the processor. IHSs may exhibit more efficiency when prefetching operations minimize the impact of remote versus local memory access during thread execution and by efficient balancing of multiple processor resources.

It is important when providing efficient IHS operation to minimize the amount of access to remote memory stores due to the high overhead or bandwidth requirements of these memory operations. Local memory stores provide an efficient source of memory store capability during application execution. However, in a multiple processor system, such as an IHS with a group of processors, multiple processors that share application thread execution may slow a system down. For example, multiple processors that share application thread execution may exhibit multiple read and write operations to data in memory that a particular group of threads share. Load balancing managers of the IHS may group threads that share data into data sharing threads known as process trees. A particular process tree is a grouping of threads that belong to a particular application and exhibit data sharing attributes among them.

Ideally, when an IHS processes a thread, for example a load/store command of a thread, the information that the load/store command requires resides in a local L1 cache. The L1 cache provides an efficient memory resource for a particular processor of the IHS by residing nearest to the particular processor and exhibiting high speed memory read and write operations. The L2 cache may be larger than the L1 cache and reside at a greater distance from the processor than the L1 cache. Since the L2 cache resides at a greater distance from the processor than the L1 cache, the processor may require more CPU cycle time to access information. Moreover, the L2 cache may also be slower to some degree than the L1 cache for memory access. In a similar manner, the L3 cache may reside still farther from the processor than the L1 cache and the L2 cache, thus providing slower performance or requiring more CPU cycles for memory access.

The processor of an IHS ideally predicts the memory requirements or particular demand load of future threads in the instruction stream. The processor attempts to prefetch or preload as much of the memory requirements of the particular demand load into local cache, such as an L1 cache, as possible. In the best case condition, when a demand load arrives or hits within the processor's thread operations, the prefetch information resides in local memory caches, such as an L1 cache.

In one embodiment of the disclosed prefetch tracking method, a particular prefetch fetches memory data into the L3 cache from a remote memory or remote memory store and initiates a hardware movement of that memory data from the L3 cache to an L1 cache for improved efficiencies of memory load/store operations. In the case where a demand load hits and the data resides in the L1 cache, this is an ideal condition requiring a minimum amount of CPU cycles or latency to access the information for processing threads. In other cases, where the information is in the L3 cache, or in remote memory, the latency increases as well as the bandwidth requirements or resources of the processor for memory operations.

The processor of the IHS may initiate hardware or software prefetches. For example, a hardware prefetch of particular memory data into L1 cache may occur automatically after an L3 prefetch. A software prefetch may occur due to demand load recognition by the processor or a particular instruction may force any prefetch operation as part of the instruction stream. Regardless of the manner of prefetch initiation, the effectiveness of the particular prefetch may be of great concern to designers and other entities in use of IHS resources.

Latency is a popular measure of prefetch efficiency. Latency is a measure of the number of processor clock cycles that a particular instruction waits to retrieve desired information from memory. If a particular prefetch is efficient, the latency for instructions that utilize that particular prefetch information is low. By measuring the latency of particular prefetches, a designer or other entity may determine the corresponding efficiency or effectiveness of the particular prefetches. By storing latency information and other data relative to multiple prefetches, a processor may generate more detail about prefetches during instruction stream operations.

One embodiment of the disclosed processor may use collections of prefetch sample data for analysis. The processor may analyze the prefetch data collections to help understand prefetch effectiveness and moreover, why some prefetches are inefficient. For example, a prefetch that the processor's instruction stream never actually uses in execution is an inefficient prefetch. In this case, the unused prefetch wastes processor resources that may be of greater value if used on other activities. It is helpful to understand examples of ineffective prefetches and to reduce or remove them from an IHS processor system.

FIG. 1 shows an information handling system (IHS) 100 including a processor 105 that employs the disclosed prefetch tracking methodology. In one embodiment, processor 105 may include multiple processor cores (not shown). IHS 100 processes, transfers, communicates, modifies, stores or otherwise handles information in digital form, analog form or other form. IHS 100 includes a bus 110 that couples processor 105 to system memory 125 via a memory controller 115 and memory bus 120. In one embodiment, system memory 125 is external to processor 105. System memory 125 may be a static random access memory (SRAM) array or a dynamic random access memory (DRAM) array. Processor 105 also includes local memory, namely L1 cache 106, L2 cache 107, and L3 cache 108. A video graphics controller 130 couples display 135 to bus 110. Nonvolatile storage 140, such as a hard disk drive, CD drive, DVD drive, or other nonvolatile storage couples to bus 110 to provide IHS 100 with permanent storage of information. I/O devices 150, such as a keyboard and a mouse pointing device, couple to bus 110 via I/O controller 160 and I/O bus 155.

One or more expansion busses 165, such as USB, IEEE 1394 bus, ATA, SATA, PCI, PCIE, DVI, HDMI and other busses, couple to bus 110 to facilitate the connection of peripherals and devices to IHS 100. A network interface adapter 170 couples to bus 110 to enable IHS 100 to connect by wire or wirelessly to a network and other information handling systems. In this embodiment, network interface adapter 170 may also be called a network communication adapter or a network adapter. While FIG. 1 shows one IHS that employs processor 105, the IHS may take many forms. For example, IHS 100 may take the form of a desktop, server, portable, laptop, notebook, netbook, tablet or other form factor computer or data processing system.

IHS 100 may take other form factors such as a gaming device, a personal digital assistant (PDA), a portable telephone device, a communication device or other devices that include a processor and memory. IHS 100 employs an operating system (OS) 190 that may store information on nonvolatile storage 145. In practice, IHS 100 may store OS 190 on nonvolatile storage 145 as OS 190. When IHS 100 initializes, the IHS loads OS 190 into system memory 125 for execution as OS 190'.

Prefetches may fall into multiple classes or categories of effectiveness. Table 1 below shows five examples of prefetch effectiveness categories. In one embodiment of the disclosed prefetch tracking method, prefetch operations move information from remote memory to local cache memory L3 cache 108. During normal processing, processor 105 may move that same prefetch information from L3 cache 108 into L1 cache 106. L1 cache 106 and L3 cache 108 are prefetch caches that store prefetch data for processor 105. Processor 105 may categorize any particular prefetch into one of five effectiveness categories as shown in Table 1 below.

TABLE 1

| Categories of prefetch effectiveness |
| --- |
| Ineffective or unproductive prefetch |
| Poor prefetch |
| Moderate prefetch |
| Good prefetch |
| Effective prefetch |

As shown in Table 1 above, processor 105 may categorize a particular prefetch as "ineffective or unproductive" if that particular prefetch does not meet a particular demand load. In other words, if a demand for the information in the particular prefetch does not realize or hit within a predetermined number of processor cycles, processor 105 may deem that particular prefetch ineffective. For example, if a particular prefetch is unproductive or ages without use for 1000 processor cycles, processor 105 may deem that particular prefetch as ineffective. Processor 105 may use any other number of processor cycles or amount of time as a predetermined threshold for ineffectiveness determination during tracking and analysis of prefetch operations. If the processor does not actually use a particular prefetch to execute an instruction of an instruction thread of the instruction stream within a predetermined threshold number of cycles, or within a predetermined amount of time since the time of the prefetch, then that particular prefetch is an "ineffective or unproductive prefetch".

In one embodiment of the disclosed prefetch tracking method, processor 105 may determine a particular prefetch to be a "poor prefetch" if that particular prefetch misses the demand load within L1 cache 106 and L3 cache 108 or any other local caches. In other words, if the demand for the information of the particular prefetch occurs before or after the particular prefetch information is in local cache memory of processor 105, processor 105 determines that particular prefetch as poor. For example, processor 105 may perform a particular prefetch operation and the demand for the particular prefetch information hits before any prefetch data reaches L3 cache 108. In that case, processor 105 may satisfy the demand load by execution of remote memory access of system memory or other remote memory that may incur multiple processor cycles of latency to service the demand load.

In another example, processor 105 may determine a particular prefetch to be a poor prefetch if the demand load for that particular prefetch occurs after L1 cache 106 reloads. In this case, processor 105 may initiate a remote memory access operation to retrieve the information that the demand load desires without use of local cache memory. Processor 105 may categorize a particular prefetch as a "moderate prefetch", as shown in Table 1 above, if that particular prefetch meets a particular demand load within L3 cache 108 just prior to prefetch timeout. In other words, a moderate prefetch supports a demand load with L3 cache 108 information, but does not provide L1 cache 106 data support. For example, a moderate prefetch may age within L3 cache 108 for 800 processor cycles, which may be less than a timeout threshold of 1000 processor cycles. In one embodiment of the disclosed prefetch tracking method, a moderate prefetch does not provide prefetch information from L1 cache 106.

As shown in Table 1 above, processor 105 may categorize a particular prefetch as a "good prefetch" if that particular prefetch meets a particular demand load just after L3 cache 108 receives the demand load information but prior to L1 cache 106 receiving the demand load information. In other words, if a demand for the information of the particular prefetch resides in L3 cache 108 for a short period, but does not reside in L1 cache 106, processor 105 deems that particular prefetch good. For example, a good prefetch may not age more than 20 processor cycles within L3 cache 108 and does not exist within L1 cache 106. A good prefetch requires a demand load to satisfy from L3 cache 108 information and does not burden L1 cache 106 resources with that good prefetch information.

Processor 105 determines a particular prefetch to be an "effective prefetch" if that particular prefetch satisfies a demand load with information from L1 cache 106. In one embodiment of the disclosed prefetch tracking method, the less aging of an effective prefetch in L1 cache 106, the better. In an ideal condition, a good prefetch satisfies a particular demand load immediately after that good prefetch information stores in L1 cache 106 regardless of L3 cache 108 operations that may occur prior. Table 1 demonstrates the conditions for prefetch effectiveness in one embodiment of the disclosed prefetch tracking method. Other classes, categories and conditions of prefetch effectiveness are possible as well beyond those shown in Table 1 for purposes of example.

Figure 2:
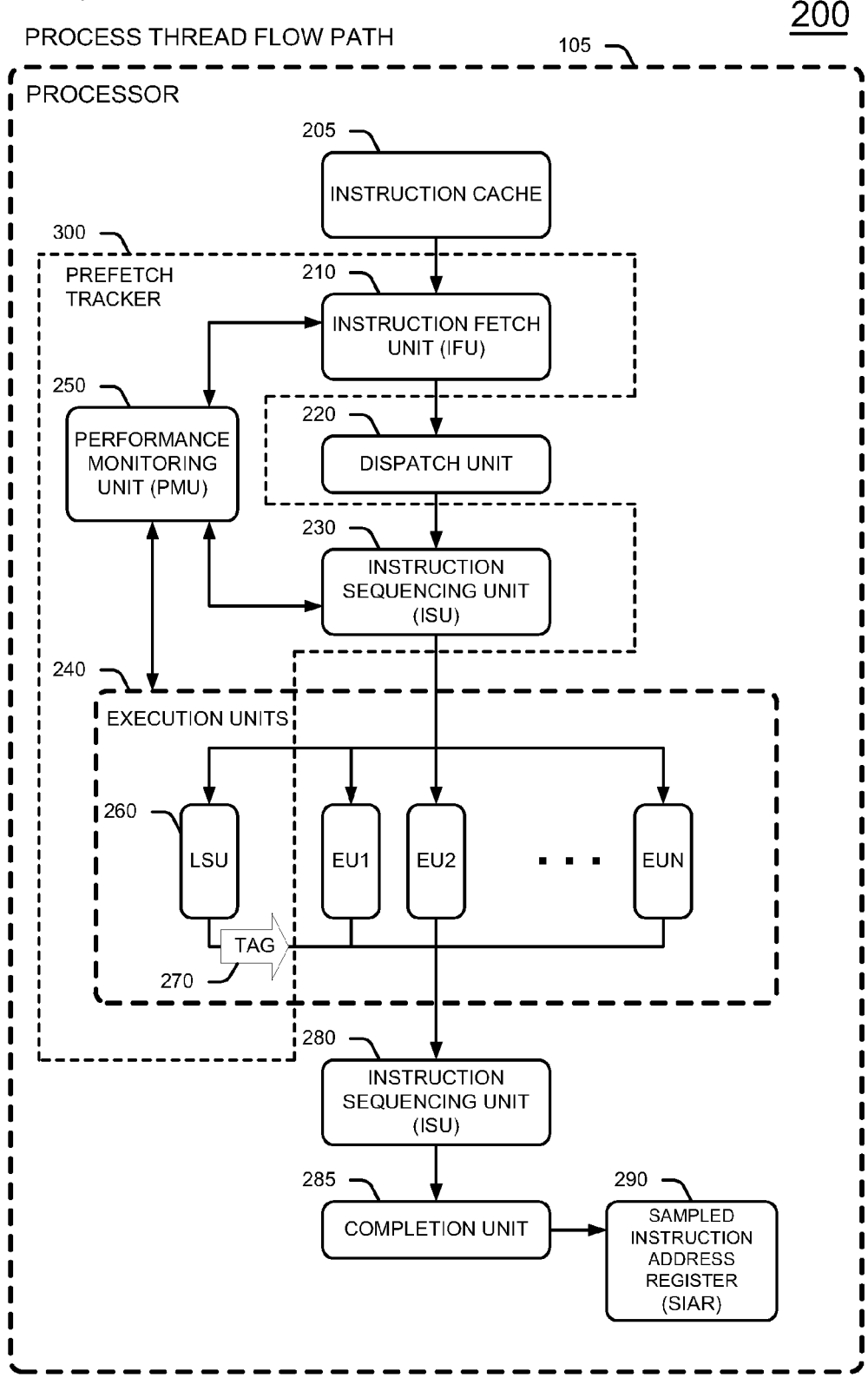
FIG. 2 shows a process thread flow path within the processor of an IHS that employs the disclosed prefetch tracking methodology.

FIG. 2 is a block diagram of a representative process thread flow path 200 or pipeline that processor 105 employs according to the disclosed prefetch tracking methodology. Processor 105 is represented as dashed lines around the functional elements that show a process thread or instruction thread flow path. Process thread flow path 200 includes an instruction cache 205 for caching instructions or process threads. Instruction cache 205 is an instruction source to processor 105 for instruction threads. Instruction cache 205 may be an L1 cache 106, and L2 cache 107, or L3 cache 108 as shown in FIG. 1. Instruction cache 205 couples to an instruction fetch unit (IFU) 210 that fetches and decodes instructions in the process thread flow path. IFU 210 couples to a dispatch unit 220 for dispatching instructions. IFU 210 may package multiple instructions into instruction groups that share particular resource requirements or other commonality. Dispatch unit 220 couples to an instruction sequencing unit (ISU) 230 that may issue instructions to execution units in an out-of-order sequence.

ISU 230 couples to execution units 240 that include multiple execution units for execution of instructions in the process flow. Execution units 240 include a load store unit (LSU) 260, and other execution units EU1, EU2, . . . EUN, wherein N represents the total number of other EU units. Other execution units may include other LSUs, floating point store units, virtual load store units or other execution units. Execution units 240 generate and consume demand loads during execution of one or more threads requiring information from local or remote memory stores of processor 105. LSU 260 may generate tag 270 information for use in prefetch tracking, as described in more detail below. Process thread flow path 200 includes a performance monitoring unit (PMU) 250 that couples to IFU 210, ISU 230, execution units 240, to provide monitoring and other support services to processor 105, as described in more detail below with respect to the disclosed prefetch tracking method.

Execution units 240 couple to instruction sequencing unit (ISU) 280. ISU 230 and ISU 280 may cooperate to provide instruction out-of-order and re-order capability for execution units 240 with respect to instruction thread processing. ISU 280 couples to completion unit 285 to enable completion of instructions following execution and reordering operations. In one embodiment of the disclosed prefetch tracking method, completion unit 285 couples to a sampled instruction address register (SIAR) 290 that stores prefetch address information. SIAR 290 provides a database (not shown) to support the store of prefetch address information. FIG. 2 includes a prefetch tracker 300, described in more detail below that includes IFU 210, ISU 230, PMU 250 and LSU 260 of execution units 240.

Figure 3:
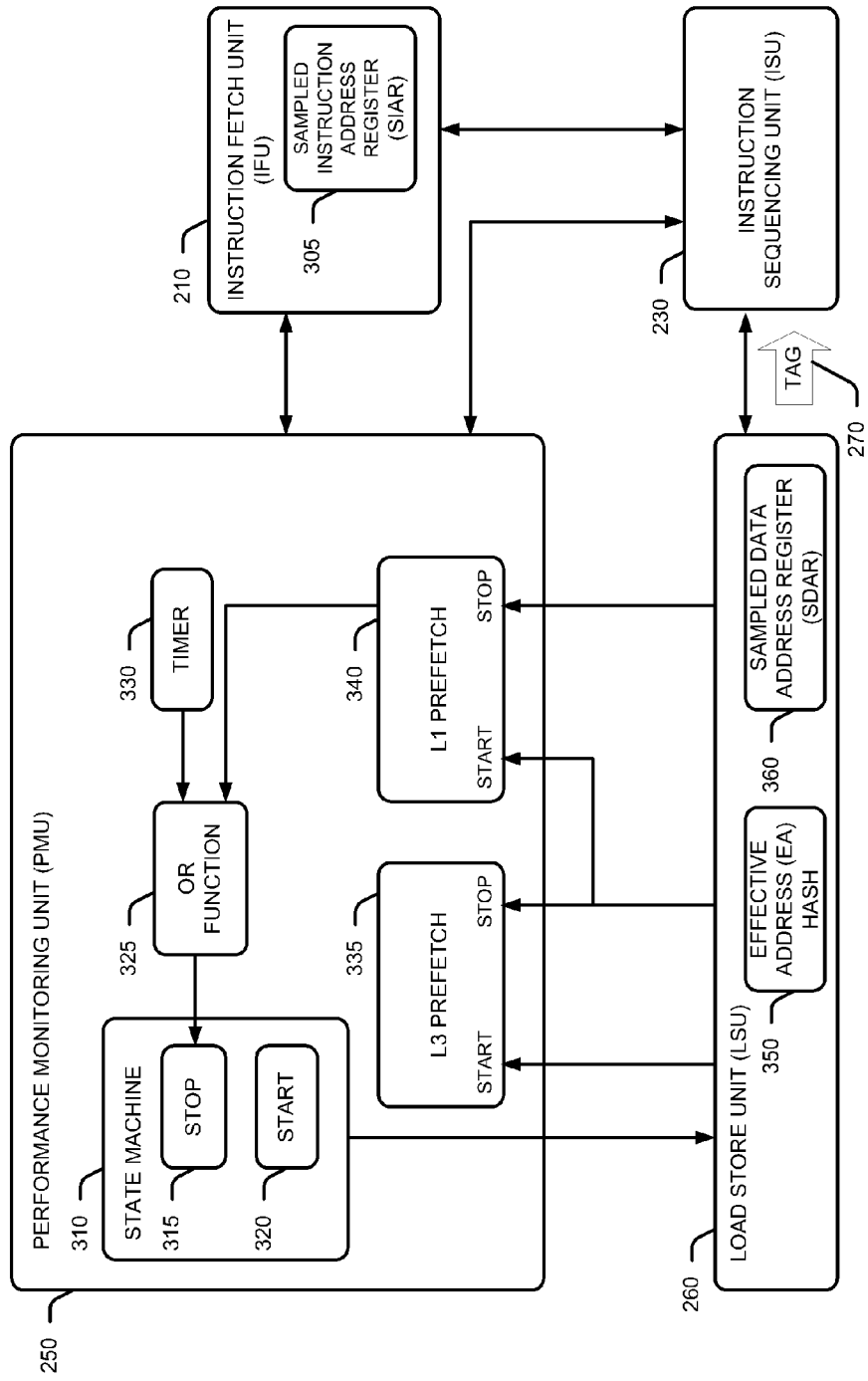
FIG. 3 shows a prefetch tracker within the processor of an IHS that employs the disclosed prefetch tracking methodology.

FIG. 3 is a block diagram showing more detail of process thread flow path 200 with respect to the disclosed prefetch tracking methodology. More specifically, FIG. 3 shows more detail of prefetch tracker 300 of FIG. 2. Prefetch tracker 300 of FIG. 3 shows the interaction of particular elements of processor 105 during prefetch generation, prefetch tracking, prefetch effectiveness monitoring, and storage of results. Prefetch tracker 300 includes PMU 250, IFU 210, LSU 260, and ISU 230 that cooperate to perform prefetch analysis in processor 105, as discussed in more detail below.

IFU 210 couples to PMU 250 and ISU 230 to provide instruction fetch information to both PMU 250 and ISU 230. In one embodiment of the disclosed prefetch tracking method, IFU 210 includes a sampled instruction address register (SIAR) 305 that stores instruction address information during instruction or prefetch sampling operations. For example, SIAR 305 may store the instruction address of any load/store instructions that processor 105 marks for tracking for particular tracking prefetch operations. SIAR 305 may provide a database (not shown) to support the store of prefetch address information. ISU 230 couples directly to PMU 250 as well as LSU 260 for sending and receiving instruction thread sequencing information.

PMU 250 includes a state machine 310 that includes a stop state 315 and a start state 320. PMU 250 may employ start state 320 to initiate tracking of a specific prefetch or tracking prefetch operation. PMU 250 may mark or tag particular load/store instructions that match a particular effective address (EA) that corresponds to the tracking prefetch. PMU 250 communicates and couples to LSU 260 to initiate prefetch tracking operations, as well as other functions. LSU 260 may randomly select an L3 prefetch operation and store a subset of data EA bits that correspond to the selected L3 prefetch in an EA hash 350 that LSU 260 employs for this purpose.

PMU includes an OR function 325, also referred to as an OR unit, that couples to a timer 330 and an L1 prefetcher 340. An L3 prefetcher 335 and L1 prefetcher 340 each couple start and stop inputs respectively to LSU 260. The stop input of L3 prefetcher 335 couples to the start input of L1 prefetcher 340. LSU 260 may initiate an L3 prefetch by a communication from LSU 260 to the start input of L3 prefetcher 335. LSU 260 initiates a stop to the L3 prefetcher by a communication from LSU 260 to the stop input of L3 prefetcher 335. At the same time as the L3 prefetch 335 stop, LSU 260 initiates an L1 prefetch by a communication from LSU 260 to the start input of L1 prefetch 340. LSU 260 initiates a stop to the L1 prefetch 340 by a communication from LSU 260 to the stop input of L1 prefetch 340.

At the same time as the L1 prefetch 340 stop, L1 prefetcher 340 communicates to OR function 325 indicating an L1 prefetch 340 stop to OR function 325. If timer 330 times out during the L1 prefetch 340 stop, OR function 325 communicates to the stop state 315 of PMU 250 to stop state machine 310. In this manner, PMU 250 may recognize the condition wherein L1 prefetch stops prior to a prefetch match or use of the currently tracking prefetch data. State machine 310 may reset, start and begin tracking the next prefetch operation after a state machine 310 stop condition.

LSU 260 includes a sampled data address register (SDAR) 360 that stores data address information corresponding to the EA of the tracking prefetch. LSU may generate tag 270 to indicate to ISU 230 that a load/store command matches the effective address (EA) of the tracking prefetch. If LSU 260 uses the tracking prefetch data, PMU 250 may generate and store latency and EA information about each tracking prefetch operation. Designers or other entities that desire improvements to prefetch operational efficiencies in IHS 100 may use this tracking prefetch information.

FIG. 4 is a representative prefetch latency diagram showing prefetch latency data in an effective address (EA) range that demonstrates one embodiment of the disclosed prefetch tracking methodology. The prefetch latency data in this EA range diagram depicts 10 prefetch samples and their corresponding latencies or processor cycle counts over time. 10 prefetch samples that number 1, 2, 3, . . . 10 are shown as horizontal bars that start at processor cycle 0 at vertical line 410 and end at their respective latency values. The prefetch latency data in this EA range diagram depicts 6 latency measurements or processor cycle demarcations. For example, vertical line 410 represents 0 processor cycles and vertical line 420 represents 200 processor cycles. Vertical line 430 represents 400 processor cycles and vertical line 440 represents 600 processor cycles. Vertical line 450 represents 800 processor cycles and vertical line 460 represents 1000 processor cycles.

In one embodiment of the disclosed prefetch tracking method, prefetch sample 1 reflects a latency of 400 processor cycles as vertical line 430 indicates. In other words prefetch sample 1 exhibits a prefetch latency of 400 processor cycles. Prefetch sample 2 exhibits a latency of approximately 150 processor cycles, as indicated by the diagram of FIG. 4.

Prefetch sample 3, prefetch sample 4, and prefetch sample 5 all exhibit a latency of 100 processor cycles, as indicated by the diagram of FIG. 4. In general, the smaller the latency or lower processor cycle count, the better for overall efficiency of prefetch operations in the IHS. Prefetch sample 6 exhibits the smallest latency count of 25 processor cycles in the particular latency diagram of FIG. 4. In contrast, prefetch sample 7, prefetch sample 8, prefetch sample 9, and prefetch sample 10 all exhibit the largest latency of 1000 processor cycles.

As shown in FIG. 4, prefetch sample 7, prefetch sample 8, prefetch sample 9, and prefetch sample 10 are each "prefetches with timeout". In other words, prefetch sample 7, 8, 9, and 10 each correspond to processor 105 sampled prefetches that did not find use within a predetermined amount of time or processor cycles, namely 1000 processor cycles. Thus, prefetch samples 7, 8, 9 and 10 are all "ineffective or unproductive prefetches". Stated alternatively, a demand load did not arrive or hit in time to utilize prefetch samples 7, 8, 9, or 10.

Prefetch sample 6 may correspond to an effective prefetch as shown in categories of prefetch effectiveness Table 1 above, exhibiting a low latency of 25 processor cycles. Prefetch sample 3, prefetch sample 4, and prefetch sample 5 each exhibiting a latency of 100 processor cycles, may correspond to a good prefetch, as shown in Table 1 above. Prefetch sample 2 that exhibits a latency of 150 processor cycles may correspond to a moderate prefetch, as shown in Table 1 above. Prefetch sample 1 with a latency of 400 processor cycles may correspond to a poor prefetch as shown in the categories of prefetch effectiveness Table 1 above.

FIG. 5 is a flowchart that shows process flow in an embodiment of the disclosed prefetch tracking methodology that provides prefetch effectiveness measurements and improvement capability in an IHS. The flowchart of FIG. 5 shows how a processor may track ineffective prefetches and eliminate or reduce those prefetches in future operations. The disclosed prefetch tracking method starts, as per block 505. In one embodiment, processor 105 initiates an L3 cache 108 prefetch, as per block 510. For example, in response to a demand load, processor 105 imitates an L3 prefetch operation to move instruction data from remote memory, such as system memory 125, to local memory, such as L3 cache 108.

OS 190 selects an L3 cache 108 target prefetch at random for tracking, as per block 515. For example, OS 190 of processor 105 may select any particular L3 prefetch in process and mark that prefetch as the target prefetch for tracking of demand load use and latency measurements. In one embodiment of the disclosed prefetch tracking method, processor 105 initiates an L1 cache 106 prefetch in response to the completion of an L3 cache 108 prefetch operation, such as the target prefetch for tracking purposes. In this manner, processor 105 initiates an L1 cache 106 target prefetch, as per block 520. In other words, processor 105 may initiate an L1 cache 106 prefetch for the target prefetch information that processor 105 tracks for latency and other information.

After the target prefetches for L3 cache 108 and L1 cache 106 initiate, the demand load for the prefetch data may hit or arrive. In other words, the demand for target prefetch data arrives in the form of a demand load from one or more execution units of execution units 240, such as LSU 260. Processor 105 tests to determine if any demand load arrives for prefetch data, as per block 530. If a demand load does not arrive, PMU 250 increments timer 330, as per block 540. PMU 250 of processor 105 increments timer 330 by 1 increment to keep track of how many processor clock cycles the particular target prefetch remains idle. In other words an idle target prefetch is a target prefetch that a consuming execution unit, such as LSU 260, does not require or request information from for target prefetch data.

Processor 105 performs a test to determine if timer 330 has reached a predetermined threshold level indicative of a "timeout" condition, as per block 545. In one embodiment, processor 105 uses a threshold of 1000 cycles to designate a particular target prefetch as meeting the timeout condition. If the target prefetch does not meet the timeout condition, processor 105 continues to test for the arrival of demand loads again, as per block 530. However, if the timeout occurs, processor 105 measures and categorizes latency and load source target prefetch information, as per block 550, in accordance with the categories of Table 1. For example, as shown in FIG. 4, processor 105 may determine the latency in processor cycles of the target prefetch exhibiting a timeout condition.

More particularly, processor 105 may categorize the target prefetch into one of multiple categories of prefetch effectiveness as those shown in Table 1 above. In the case of a target prefetch timeout, processor 105 categorizes the target prefetch as an "ineffective or unproductive prefetch operation". Processor 105 may also store load source prefetch information, such as effective address or effective address range source information for the target prefetch, as per block 570. For example, processor 105 may store instruction address information in SIAR 305 and data address information in SDAR 360.

Returning to block 530, processor 105 may alternatively detect a demand load arrival instead of a lack of demand load arrival. In that case, OS 190 of processor 105 performs a test to determine if the demand load matches the target prefetch, as per block 560. If the demand load does not match the target prefetch, processor 105 continues testing for demand load arrival, as per block 530. However, if the demand load target prefetch test is a match, processor 105, using OS 190, measures and categorizes latency and load source target prefetch information as in the case of a target prefetch timeout again, as per block 550, in accordance with the categories of Table 1. OS 190 in processor 105 categorizes the latency and load source target prefetch information into the remaining categories (non time-out categories) of poor prefetch, moderate prefetch, good prefetch and effective prefetch in accordance with the categories of Table 1.

Processor 105 stores target prefetch information, as per block 570. In other words, processor 105 may store prefetch information such as target prefetch latency counts, category of prefetch effectiveness, load source information as well as other information about the target prefetch. Processor 105 may store this target prefetch information in any local or remote memory store of IHS 100 for later retrieval and analysis by designers and other entities. Processor 105 or other entities of IHS 100 may use the target store information to develop histograms or other compilations of multiple sample target prefetch data for analysis.

Designers or other entities may remove prefetches of those loads with latency greater than the predetermined latency threshold, as per block 580. In this particular example, the latency threshold is 1000 cycles, but smaller and larger latency thresholds are also acceptable depending on the particular application. By analysis of sample target prefetch data, processor 105 may identify those target prefetches that exceed the predetermined latency threshold and timeout, such as 1000 processor cycles. Processor 105 may mark these timeout target prefetches as prefetches with timeout as shown the prefetch sample examples of FIG. 4. Designers, or other entities of IHS 100 may mark those prefetches with timeout for removal during future instruction thread operations to achieve improved efficiencies in IHS 100 instruction processing operations, as per block 580. For example, processor 105 may prohibit prefetching in an address range associated with ineffective prefetched instructions. For example, PMU 250 may block or otherwise prohibit prefetching in a particular address range during fetch and decode operations within IFU 210 for those ineffective prefetched instructions. The prefetch tracking ends, as per block 590.

As will be appreciated by one skilled in the art, aspects of the disclosed load balancing management technology may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method of determining the ineffectiveness of prefetches in a processor, the method comprising:
   prefetching, by the processor, a plurality of instructions from an instruction source;
   storing, by the processor, the plurality of instructions in a prefetch cache;
   selecting, by the processor, a particular instruction of the plurality of instructions for ineffectiveness tracking to categorize the particular instruction into one of a plurality of prefetch effectiveness categories, wherein the selecting includes tagging the particular instruction as a target instruction;
   initiating, by a processor performance monitoring unit (PMU) in the processor, a timer to measure the time that the particular instruction ages in the prefetch cache before the particular instruction times out in the prefetch cache;
   testing, by the processor PMU, for ineffectiveness of the prefetch of the particular instruction by accessing the timer to determine if timeout is reached for the particular instruction, thus designating an ineffective prefetched instruction;
   storing in a database, by the processor, prefetch information that includes a prefetch source address associated with the particular instruction, a prefetch age of the particular instruction and a category of prefetch effectiveness for the particular instruction; and
   prohibiting, by the processor PMU, the processor from prefetching instructions from the instruction source in an address range associated with ineffective prefetched instructions.

2. The method of claim 1, wherein the testing step comprises determining if the particular instruction exceeds a predetermined time threshold to designate the particular instruction as an ineffective prefetched instruction.

3. The method of claim 1, wherein the prefetch of the particular instruction includes the prefetch of data associated with the particular instruction.

4. The method of claim 1, wherein the prefetch cache is one of an L1, L2 and L3 cache.

5. The method of claim 1, wherein the plurality of instructions are load/store instructions.

6. The method of claim 1, wherein the instruction source is other than a local cache.

7. A processor, comprising:
   an instruction source that provides an instruction stream for execution by the processor;
   an instruction fetcher, coupled to the instruction source, that fetches instructions from the instruction source;
   a prefetch cache, coupled to the instruction fetcher, that stores prefetched instructions, a particular instruction of the prefetched instructions being selected by the processor for ineffectiveness tracking to categorize the particular instruction into one of a plurality of prefetch effectiveness categories, wherein the processor tags the particular instruction as a target instruction;
   a plurality of execution units for executing instructions;
   a dispatcher, coupled to the instruction fetcher and the plurality of-execution units, that dispatches instructions to the plurality of execution units; and
   a performance monitoring unit (PMU), coupled to the instruction fetcher, the prefetch cache and the plurality of execution units, the PMU being configured to;
      initiate a timer to measure the time that the particular instruction ages in the prefetch cache before the particular instruction times out in the prefetch cache; and
      test for ineffectiveness of the prefetch of the particular instruction by accessing the timer to determine if timeout is reached for the particular instruction, thus designating an ineffective prefetched instruction;
   wherein the processor stores in a database prefetch information that includes a prefetch source address associated with the particular instruction, a prefetch age of the particular instruction and a category of prefetch effectiveness for the particular instruction; and
   wherein the processor PMU prohibits the processor from prefetching instructions from the instruction source in an address range associated with ineffective prefetched instructions.

8. The processor of claim 7, wherein the PMU is configured to determine if the particular instruction exceeds a predetermined time threshold to designate the particular instruction as an ineffective prefetched instruction.

9. The processor of claim 7, wherein the prefetch of the particular instruction includes the prefetch of data associated with the particular instruction.

10. The processor of claim 7, wherein the prefetch cache is one of an L1, L2 and L3 cache.

11. The processor of claim 7, wherein the plurality of instructions are load/store instructions.

12. The processor of claim 7, wherein the instruction source is other than a local cache.

13. An information handling system (IHS), comprising:
a memory; and
a processor coupled to the memory, the processor including:
an instruction source that provides an instruction stream for execution by the processor;
an instruction fetcher, coupled to the instruction source, that fetches instructions from the instruction source;
a prefetch cache, coupled to the instruction fetcher, that stores prefetched instructions, a particular instruction of the prefetched instructions being selected by the processor for ineffectiveness tracking to categorize the particular instruction into one of a plurality of prefetch effectiveness categories, wherein the processor tags the particular instruction as a target instruction;
a plurality of execution units for executing instructions;
a dispatcher, coupled to the instruction fetcher and the plurality of execution units, that dispatches instructions to the plurality of execution units; and
a performance monitoring unit (PMU), coupled to the instruction fetcher, the prefetch cache and the plurality of execution units, the PMU being configured to:
initiate a timer to measure the time that the particular instruction ages in the prefetch cache before the particular instruction times out in the prefetch cache; and
test for ineffectiveness of the prefetch of the particular instruction by accessing the timer to determine if timeout is reached for the particular instruction, thus designating an ineffective prefetched instruction;
wherein the processor stores in a database prefetch information that includes a prefetch source address associated with the particular instruction, a prefetch age of the particular instruction and a category of prefetch effectiveness for the particular instruction; and
wherein the processor PMU prohibits the processor from prefetching instructions from the instruction source in an address range associated with ineffective prefetched instructions.

14. The IHS of claim 13, wherein the PMU is configured to determine if the particular instruction exceeds a predetermined time threshold to designate the particular instruction as an ineffective prefetched instruction.

15. The IHS of claim 13, wherein the prefetch of the particular instruction includes the prefetch of data associated with the particular instruction.

16. The IHS of claim 13, wherein the prefetch cache is one of an L1, L2 and L3 cache.

* * * * *